US010915273B2

United States Patent
Bindana et al.

(10) Patent No.: US 10,915,273 B2
(45) Date of Patent: Feb. 9, 2021

(54) APPARATUS AND METHOD FOR IDENTIFYING AND PRINTING A REPLACEMENT VERSION OF A DOCUMENT

(71) Applicant: XEROX CORPORATION, Norwalk, CT (US)

(72) Inventors: Srinivasarao Bindana, Andhra Pradesh (IN); Sainarayanan Gopalakrishnan, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/405,117

(22) Filed: May 7, 2019

(65) Prior Publication Data
US 2020/0356320 A1 Nov. 12, 2020

(51) Int. Cl.
*G06F 3/12* (2006.01)

(52) U.S. Cl.
CPC ............ *G06F 3/1208* (2013.01); *G06F 3/126* (2013.01); *G06F 3/1256* (2013.01); *G06F 3/1285* (2013.01)

(58) Field of Classification Search
CPC .............................. G06F 3/1208; G06F 3/1256
See application file for complete search history.

(56) References Cited

U.S. PATENT DOCUMENTS

| 6,819,445 | B1 | 11/2004 | Stevenson et al. | |
|---|---|---|---|---|
| 9,524,127 | B2 | 12/2016 | Csurka et al. | |
| 9,804,807 | B2 | 10/2017 | Levine et al. | |
| 2008/0235276 | A1* | 9/2008 | Erol | G10L 13/00 |
| 2009/0080010 | A1* | 3/2009 | Nanaumi | G03G 15/502 |
| | | | | 358/1.13 |
| 2016/0016753 | A1* | 1/2016 | Suzuki | G06K 15/404 |
| | | | | 270/58.08 |
| 2017/0060487 | A1* | 3/2017 | Takeuchi | G06Q 30/04 |

* cited by examiner

*Primary Examiner* — Ibrahim Siddo
(74) *Attorney, Agent, or Firm* — Jones Robb, PLLC

(57) ABSTRACT

Systems, methods, and devices are configured to identify and print a replacement version of an electronic document. They include receiving an electronic document as part of a print request from a user. They also include accessing at least one document retention location associated with the received electronic document and comparing a set of electronic documents in the at least one document retention location with the received electronic document. They further include providing a notification to the user, the notification comprising identification of at least one electronic document from the set of electronic documents for review as a replacement electronic document for the received electronic document.

15 Claims, 7 Drawing Sheets

APPARATUS AND METHOD FOR IDENTIFYING AND PRINTING A REPLACEMENT VERSION OF A DOCUMENT

TECHNICAL BACKGROUND

Networked printer systems allow a user to submit a print job for an electronic document to a queue or server from a plurality of user devices that can subsequently be printed using one of a large number of different printers or multi-function devices (MFDs). The arrangement allows a user to walk to any one of the supported printers and select the job to be printed. In some cases, the user includes an electronic file or document that he is unaware may have a better (e.g., later) version available. For example, electronic documents or files may be routinely edited and exchanged among different places by a plurality of users for a variety of purposes without the user requesting to print the electronic document knowing that these versions have been created. Further, when a user prints an electronic document sourced as a file externally, such as from a web site on the internet, the user may have no information as to whether the electronic document he is printing is the best, most up to date, or latest version.

Currently, a user may have to remember or keep track of the files that he/she is modifying and/or creating and may have to manually check if the selected file is the correct, best, or latest file before the file is submitted as an electronic document for printing. Printing an electronic document that is not the best, correct, or latest version, or is not the version the user desired to print, results in printing an electronic document that is not suited to the user's purposes. The user may have to proceed through the steps of resubmitting the electronic document, as a print job to the print queue or printer, to print the correct, proper, or latest version of the electronic document taking additional time and resources of the user. Further, if the print job has a large number of pages, the number of test pages, if not user selectable, may also be large, leading to increased use of paper or printable media and excess waste. Therefore, there is a need to create a mechanism for determining and identifying a proper e.g., latest) replacement version for an electronic document that is part of a printing request by a user.

Overview

Exemplary embodiments described herein include methods, systems, and apparatuses for identifying and printing a replacement version of an electronic document. An exemplary method includes receiving an electronic document as part of a print request from a user. The method also includes accessing at least one document retention location associated with the received electronic document and comparing a set of electronic documents in the at least one document retention location with the received electronic document. The method further includes providing a notification to the user, the notification comprising identification of at least one electronic document from the set of electronic documents for review as a replacement electronic document for the received electronic document.

An exemplary apparatus includes a memory for storing an electronic file associated with a print request from a user. The apparatus further includes a processor configured to provide instructions for accessing at least one file repository associated with the stored electronic file and compares a set of electronic files in the at least one file repository with the stored electronic file. The apparatus also provides a notification to the user, the notification comprising identification of at least one electronic file from the set of electronic files for review as a replacement electronic file, to associate with the print request, for the stored electronic file.

An exemplary printing apparatus includes a printing engine that prints information associated with an electronic document on a physical readable medium based on instructions in a print job for the electronic document requested by a user. The printing apparatus also includes a print processor that provides instructions to receive the print job and the electronic document for the print job requested by the user, the print processor further accessing at least one document retention location associated with the electronic document of the print job and compares a set of electronic documents in the at least one document retention location with the electronic document of the print job. The printing apparatus also includes a user interface that displays a notification message identifying least one electronic document from the set of electronic documents for review as a replacement electronic document for the electronic document of the print job.

BRIEF DESCRIPTION OF THE DRAWINGS

These and other aspects, features, and advantages of the present disclosure will be described or become apparent from the following detailed description of the preferred embodiments, which is to be read in connection with the accompanying drawings.

Figure 1:
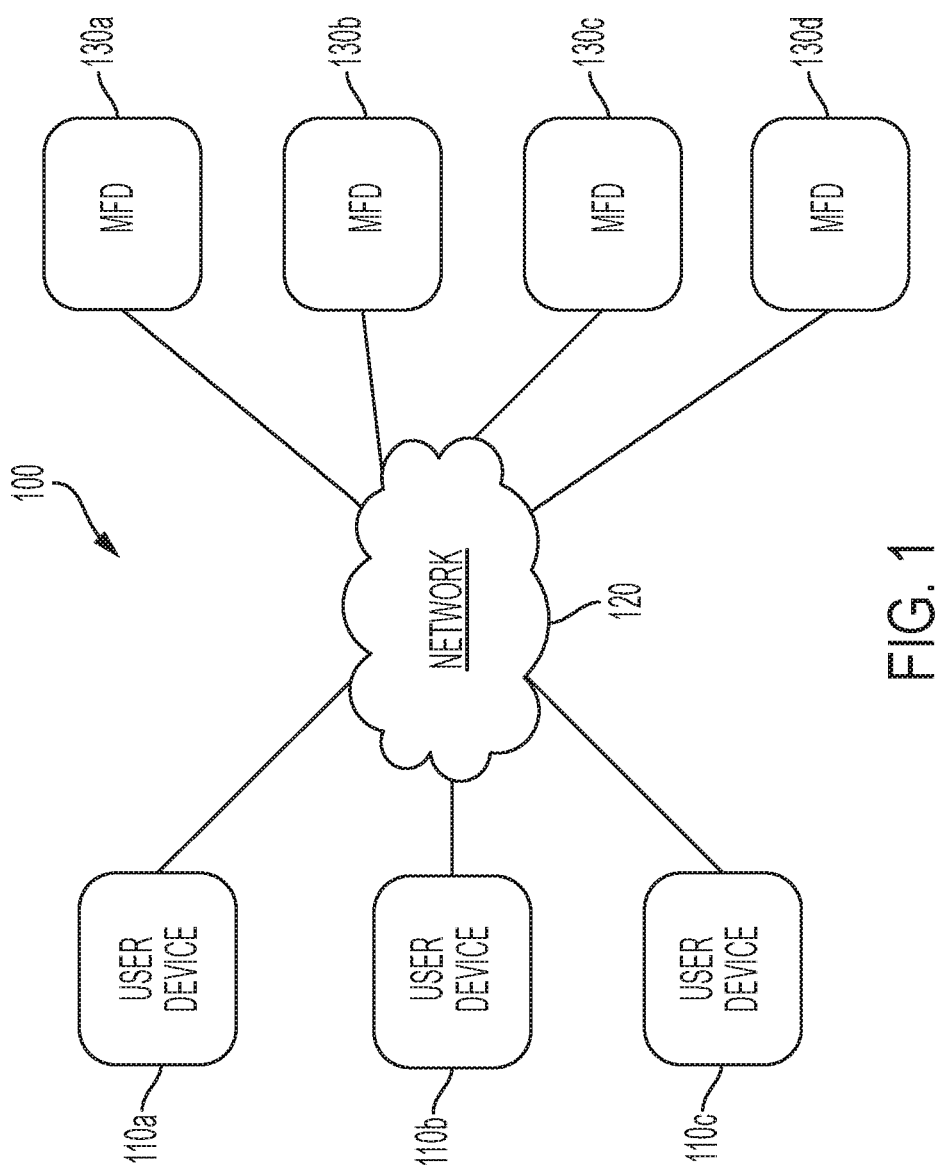
FIG. 1 depicts an exemplary system for identifying and printing a replacement version of an electronic document.

It should be understood that the drawing(s) are for purposes of illustrating the concepts of the disclosure and are not necessarily the only possible configuration for illustrating the disclosure.

DETAILED DESCRIPTION

In some embodiments described herein, a process or mechanism is used to perform one or more of the aspects of the present disclosure describing identifying and printing a replacement version of an electronic document. The process includes receiving an electronic document as part of a print request by the user. The process also includes accessing at least one document retention location associated with the received electronic document and comparing a set of electronic documents in the at least one document retention location with the received electronic document. The process further includes providing a notification to the user, the notification including identification of at least one electronic document from the set of electronic documents for review as a replacement electronic document for the received electronic document. The process may further include other aspects and mechanisms of the present disclosure as described herein.

In some embodiments, the notification may be provided using a communication through a network as an email message, a short message service (SMS) message, or a multimedia message service (MMS) message. Further, the notification may be provided as a message displayed on a webpage that is accessible by the user. Additionally, the notification may be provided as a notification message displayed as part of a user interface on a printing device, a computing device associated with the user, or a user device.

In some embodiments, the document retention location may include a memory location on a user device or on a printing device. Further, the document retention location may include a memory location on a shared network storage device. Additionally, the document retention location may be a location accessed through a uniform resource locator (URL) in a network. Also, in some embodiments, the document retention locations may be selectable by the user as part of creating the print request or as a set of default locations for any printing activity as part of a selection screen on a user interface. As part of the user selection, access to any or all the selected document retention locations may be enabled or disabled, such as in conjunction with creating any print job activity including the print request.

In some embodiments, the process may further include identifying at least one electronic document from the set of documents as a possible replacement to be reviewed by the user for the received electronic document.

In some embodiments, the process may further include replacing the received electronic document with one of the at least one of the electronic documents based on an input from the user after the notification is provided to the user. The process may further include printing the replacement electronic document as part of fulfilling the print request from the user.

In some embodiments, the process may further include determining if at least one electronic document in the at least one document retention location is to be considered as a replacement document for the received electronic document. In some instances, the determination may be performed based on one or more of a user identification, an owner identification, a filename, a file size, a page length, a save date, and a creation date of the received electronic document. For example, the determination may include determining if the save date of the at least one electronic document in the at least one document retention location is a later date than the save date of the received electronic document.

In some embodiments described herein, an apparatus may be included to perform one or more of the aspects of the disclosure described by the various embodiments herein. The apparatus includes a memory for storing an electronic file associated with a print request from a user. The apparatus also includes a processor, with the processor configured to provide instructions for accessing at least one file repository or memory location associated with the electronic file and comparing a set of electronic files in the at least one file repository with the electronic file stored in the memory. The processor is further configured to provide a notification to the user. The notification includes identification of at least one electronic file from the set of electronic files for review as a replacement electronic file for the electronic file stored in the memory and further printing as an electronic document. The apparatus may include additional electrical elements used in conjunction with general electronics and printing technology as well as specific electrical elements necessary for operation in specific types of wired and/or wireless communication networks. The processor may further be embodied as one or more processors and may include other elements necessary to perform the various operations as described above. The memory may include additional elements, including but not limited to, a data storage element, and a memory for storing program instructions. The memory or similar element may provide the program instructions to the processor in order to execute the various mechanisms in the embodiments described herein.

In some embodiments described herein, a printing apparatus may be included to perform one or more of the aspects of the disclosure described by the various embodiments herein. The printing apparatus includes a printing engine that prints information associated with an electronic document on a physical readable medium based on instructions in a print job for the electronic document requested by a user. The printing apparatus further includes a print processor that provides instructions to receive the print job and the electronic document for the print job requested by the user. The print processor further accesses at least one document retention location associated with the electronic document of the print job and compares a set of electronic documents in the at least one document retention location with the electronic document of the print job. The printing apparatus also includes a user interface that displays a notification message identifying least one electronic document from the set of electronic documents for review as a replacement electronic document for the electronic document of the print job. The printing apparatus may include additional electrical or electromechanical elements used in conjunction with general electronics and printing technology as well as specific electrical elements necessary for operation in specific types of wired and/or wireless communication networks. The print processor further may include one or more processors as well as other elements necessary to perform the various operations as described herein.

The implementation of one or more of the aspects of the processes, mechanisms, systems, apparatus, and devices of the present embodiment described herein provides the user with some level of assurance of printing the correct, proper, most up to date, and/or desired version of the electronic file or document as part of a requested print job from a user. The use of such an implementation provides a convenient mechanism to identify any available versions of the electronic file or document, including the latest version, for printing. The implementation provides efficiency, including time and resource savings, for the user by potentially eliminating the need to delete and re-submit print jobs when the incorrect or undesired (i.e., latest) version of an electronic file or document is not included as part of the originally submitted print job. Further, the implementation may result in reduced waste of consumables, such as printing media and ink or toner, used in the printing process.

These and additional operations are further described with respect to the embodiments depicted in FIGS. 1-7 below.

FIG. 1 illustrates an exemplary system 100 for printing and reusing customized sample sets while printing documents. System 100 includes a plurality of user devices 110*a*-110*c* coupled to a plurality of multiple function devices (MFDs) 130*a*-130*d* through a network 120. User devices 110*a*-110*c* and MFDs 130*a*-130*d* may be located throughout sites within the same building or dwelling and connected through one or both of a wired and wireless local area network using a communication protocol including, but not limited to, Institute of Electrical and Electronics Engineers (IEEE) standard 802.3, Wi-Fi, and IEEE standard 802.11. One or more of user devices 110a-110c may additionally be located in a different or remote facility from the dwelling or building where the one or more of the MFDs 130a-130d are located. The one or more remotely located user devices 110a-110c may be communicatively coupled to the one or more MFDs 130a-130d through a private or public network using a communication protocol including, but not limited to, Internet Protocol or any cellular communication protocols.

In operation, system 100, using a combination of one or more of the user devices 110a-110c and MFDs 130a-130d performs various aspects of a mechanism for identifying and printing a replacement version of an electronic document. The mechanism includes receiving, at one the MFDs 130a-130d, a print job requested by a user. The received print job includes, among other things, an electronic document. The print job may be created by the user either at the one of the MFDs 130a-130d or at one of the user devices 110a-110c. The method also includes accessing at least one document retention location associated with the electronic document in the received print job. The document retention location may include a memory location on a user device or on a printing device. The document retention location may also include a memory location on a shared network storage device. Additionally, the document retention location may be a location accessed through a uniform resource locator (URL) in a network. The document retention locations may be selectable and enabled/disabled by the user while creating the print job or as a part of setting default locations using a selection screen on a user interface on the one of the MFDs 130a-130d or at one of the user devices 110a-110c.

The mechanism in system 100 additionally includes comparing a set of electronic documents in the at least one document retention location with the electronic document in the received print job. The accessing and/or comparing functions may be included as operations in the one of the user devices 110a-110c and/or at the one of the MFDs 130a-130d. The process further includes providing a notification to the user, the notification including identification of at least one electronic document from the set of electronic documents for review as a replacement electronic document for the electronic document included in the received print job. The notification may be provided from the one of the user devices 110a-110c or from the one of the MFDs 130a-130d. In some embodiments, the notification may be provided by the one of the MFDs 130a-130d as a communication through network 120 or another network (e.g., the internet) to the one of the user devices 110a-110c using email, an SMS message, or an MMS message. Further, the notification may be provided as a message displayed on a webpage that is accessible by the user on any user device. In some embodiments, the notification may be provided as a notification message displayed as part of a user interface on the one of the MFDs 130a 130d or on the one of the user devices 110a-110c.

In some embodiments, the mechanism may further include identifying at least one electronic document from the set of documents as a replacement for the electronic document in the received print job. The identification may be included as an operation in the one of the user devices 110a-110c and/or at the one of the MFDs 130a-130d.

In some embodiments, the mechanism may further include replacing the electronic document in the received print job at the one of the MFDs 130a-130d with one of the at least one of the electronic documents based on an input from the user after the notification is provided to the user. The mechanism may further include printing the replacement electronic document at the one of the MFDs 130a-130d as part of completing the print job requested by the user.

In some embodiments, the mechanism may further include determining if at least one electronic document in the at least one document retention location is to be considered as a replacement document for the electronic document in the received print job. The determination may be included as an operation in the one of the user devices 110a-110c and/or at the one of the MFDs 130a-130d. In some instances, the determination may be performed based on at least one of several possible characteristics associated with electronics including those described above. For example, the determination may include determining if the save date of the at least one electronic document in the at least one document retention location is a later date than the save date of the electronic document in the received print job.

The user devices 110a-110c may be any one of a personal computer, a laptop computer, a computer network terminal, a tablet, a cellular phone, a smartphone, and the like. User devices 110a-110c may include processors, displays, communication interfaces, user interfaces, and memories, along with various program modules stored in a memory and executed by a processor, to implement specific functions, such as print servers, print drivers, graphic user interface menus, and communication protocols. MFDs 130a-130d may be any one of a printer, a printer/fax machine, a printer/scanner machine, and the like. MFDs 130a-130d may include one or more processors, a printer mechanism, mechanical printing media processors, a network interface, a user interface, and storage elements, along with various program modules stored in the storage elements and executed by the one or more processors. Details related to devices similar to User devices 110a-110c and MFDs 130a-130d will be described in further detail below.

Figure 2:
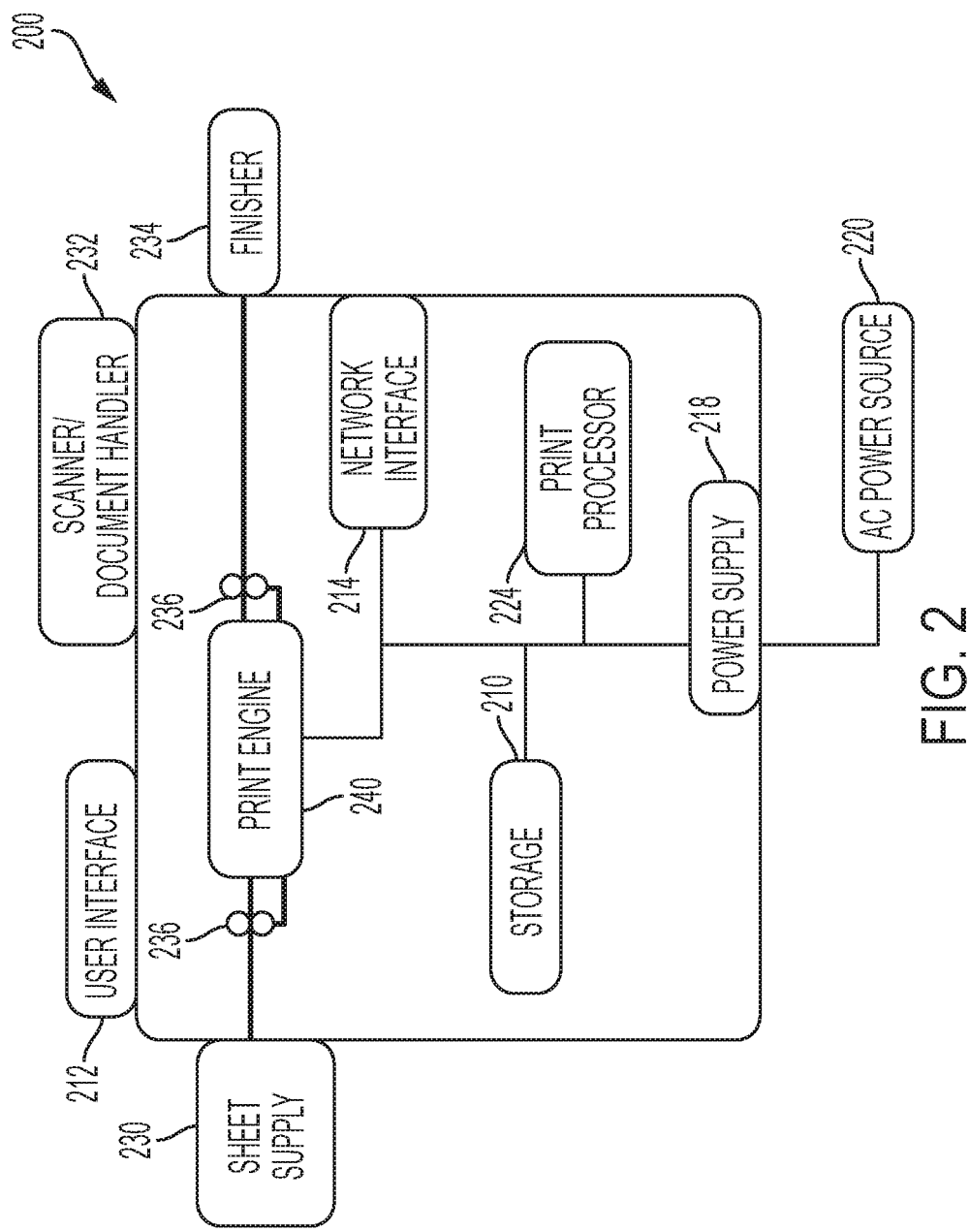
FIG. 2 depicts an exemplary printing device for identifying and printing a replacement version of an electronic document.

FIG. 2 illustrates an exemplary printing device 200, which can be used with systems and methods for identifying and printing a replacement version of an electronic document. Printing device 200 may operate in a manner similar to MFDs 130a-130d described in FIG. 1. Printing device 200 may also be embodied as, or incorporated in, a printer, copier, multi-function machine, or other device that includes the capability to print an electronic document on a physical printable and/or readable media, such as paper. Printing device 200 includes a marking device or printing engine 240 capable of printing markings on sheets of print media, a print processor 224 operatively coupled to the printing engine 240, a user interface 212 operatively coupled (not shown) to the print processor 224, and a network interface 214 operatively coupled to the print processor 224 and printing engine 240. A storage element 210 is also operatively coupled to network interface 214, print processor 224, and printing engine 240. Printing engine 240 is also operatively coupled to sheet supply 230, scanner/document handler 232, media path 236, and finisher 234. Power supply 218 receives input from power source 220 and provides power to components in printing device 200 including storage 210, network interface 214, print processor 224, and printing engine 240. Other elements may be included in printing device 200 but are not described here in the interest of conciseness.

In operation, print processor 224 receives instructions associated with a print job requested by a user. The instructions may be provided through user interface 212 or through network interface 214 from a user device (e.g., one of the user devices 110a-110c). The instructions include directing print processor 224 to print an electronic document that is associated with or provided with the print job. Print processor 224 may also be referred to as an image processor and operates in a different manner than a general purpose processor because it is specialized for processing image data, such as the data in an electronic document. Print processor 224 further accesses a document retention location associated with the electronic document. The document retention location may be any memory location that printing apparatus 200 has access to and may further include only those memory locations specified for access by the user.

Print processor 224 further compares a set of electronic documents located or stored in the document retention location to the electronic document that is included in or associated with the received print job. In conjunction with the comparison, print processor 224 may further determine if at least one electronic document in the document retention location is to be considered as a replacement document for the electronic document that is included in or associated with the received print job. In some embodiments, print processor 224 may determine if the save date of the at least one electronic document in the document retention location is a later date than the save date of the electronic document that is included in or associated with the received print job. In other embodiments, other characteristics may be compared and/or used in the determination, including various characteristics described above or included as part of any metadata provided with or in the electronic documents.

Print processor 224 may further identify at least one electronic document from the set of documents as a replacement for the electronic document that is included in or associated with the received print job as a result of the comparison and/or determination. If print processor 224 identifies at least one document, print processor 224 provides instructions and information to user interface 212 for displaying a message identifying the at least one electronic document with a menu entry option to review the document(s) for review by the user as a replacement electronic document for the electronic document that was included in or associated with the received print job.

User interface 212 may display additional messages associated with identifying and printing the replacement document as well as accept inputs from the user. In some embodiments, user interface 212 may include an entry screen that allows a user to enable or disable the replacement version identification feature. The entry screen may be displayed as a general selection entry for the user or as part of creating or editing instructions associated with a print job. Further, user interface 212 may include an entry screen that allows a user to input one or more search document retention locations. The entry screen may also include selectable buttons for individually enabling or disabling access to one or more of the entered document retention locations.

In some embodiments, user interface 212 may include one or more user selectable buttons or entries as part of the notification message screen displayed to the user. For instance, the notification message screen may include a selectable entry for opening and reviewing the possible replacement versions. The notification message may also include selectable entries for accepting one of the possible replacement versions for printing in place of the version of electronic document included in or associated with the received print job. In conjunction with selecting one of the replacement versions, the entry information is sent from user interface 212 to print processor 224 to allow print processor 224 to replace the electronic document included in or associated with the received print job with the selected replacement electronic document. The notification screen may also include a selectable entry for ignoring all the possible replacement versions and continue printing and continue with printing the version of electronic document included in or associated with the received print job. Additional information regarding one or more messages that may be displayed on a user interface, such as user interface 212, will be discussed below.

Printing engine 240 prints information or markings representing the data associated with, or included in, the electronic document (e.g., either the electronic document included in or associated with the received print job of the replacement electronic document) on a physical readable medium based on instructions provided by print processor 224. The printing mechanism is initiated by those instructions in signals communicated from print processor 224 to printing engine 240. The instructions may be created in print processor or may be processed or interpreted in print processor 224 based on instructions provided in the print job requested by the user. Printing engine 240 may include any marking device that applies a marking material (e.g., toner, inks, etc.) to continuous print media or sheets of print media, whether currently known or developed in the future and can include, for example, devices that use a photoreceptor belt or an intermediate transfer belt or devices that print directly to print media (e.g., inkjet printers, ribbon-based contact printers, etc.). Scanner/document handler 232 may be used for feeding or re-feeding (e.g., in duplex print mode) printed media sheets, either automatically or manually with inputs from a user, in any of the printing, scanning or faxing modes available. Sheet supply 230 may include one or more trays for storing and positioning printable media for entry onto media path 236. Sheet supply 230 may include a bypass tray that allows external print media, such as previously printed pages to be added and entered into media path 236 for marking instead of, or in addition to, any printable media already in sheet supply 230. Media path 236 is positioned to supply continuous media or sheets of print media (e.g., paper, cardstock, or velum) from sheet supply 230 to the marking device(s) included in printing engine 240. After printing engine 240 generates and applies various markings to sheets of print media, the sheets may optionally pass to finisher 234 which can flip, fold, staple, sort, collate, etc., the various printed sheets based on the additional information associated with printing the electronic document.

Storage 210 may store, maintain, and provide the electronic document that is included in or associated with the received print job as well as information, such as a data file, including specific data associated with the printing of the electronic document, including instructions for printing provided as part of the print job. Storage 210 may also maintain information related to the mechanism for identifying the replacement documents including the list of accessible document retention locations for use in the comparison to the electronic document included in or associated with the print job. Storage 210 may further provide temporary storage for any possible replacement electronic documents identified for review by the user.

Figure 3:
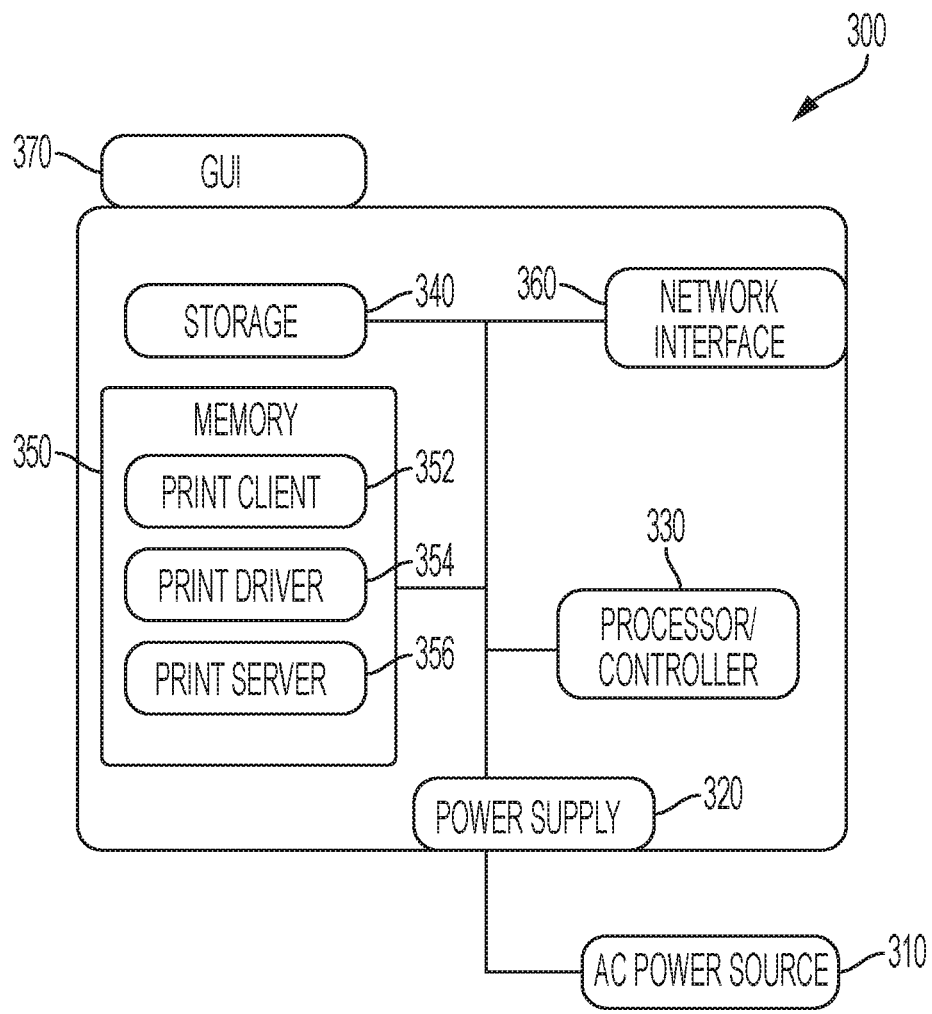
FIG. 3 depicts an exemplary user device for identifying and printing a replacement version of an electronic document.

FIG. 3 illustrates an exemplary user device 300 which can be used with systems and processes for identifying and printing a replacement version of an electronic document. User device 300 may operate in a manner similar to user devices 110a-110c described in FIG. 1. Further, some or all the elements of user device 300 may be included as part of a printer or MFD, such as printing device 200 in FIG. 2 or MFDs 130a-130d in FIG. 1. User device 300 may also be embodied as, or incorporated as part of, a print server, a personal computer, a tablet, a smartphone, a portable computing device, etc. User device 300 includes a controller/processor 330 operatively coupled to a network interface 360, storage 340, and memory 350. Controller/processor 330 is also operatively coupled (not shown) to graphical user interface (GUI) 370. Power supply 320 receives input from power source 310 and provides power to components in user device 300 including storage 340, memory 350, network interface 360, and processor/controller 330. Other elements may be included in user device 300 but are not described here in the interest of conciseness.

Network interface 360 is used for communications to and from user device 300 and comprises one or both of a wired or wireless connection and circuitry to support one or more communication protocols including, but not limited to, IEEE802.11, Ethernet, and cellular networks. Processor/controller 330 controls the various actions, computations, functions, and processes, including various aspects of the embodiments described herein, by receiving inputs and providing instructions to the various elements within user device 300 or within a device incorporating user device 300. Processor/controller 330 may also receive inputs and provide instructions to other devices, such as printing device 200, to control aspects of the other devices, including the various aspects of the embodiments described herein, through network interface 360.

A storage element 340 provides storage for information and data (e.g., electronic documents prior to selection for printing) created or used by user device 300. Storage element 340 may include large storage capacity elements, such as optical, magnetic, and capacitor based elements that are writeable and readable by processor/controller 330. GUI 370 provides one or more interface elements to interact with a user. GUI 370 may include one or more of a keyboard, mouse, voice detector or microphone, and touch pad in which to enter instructions from a user. GUI 370 may additionally include a speaker or display in which to convey messages, instructions, and menu options to the user.

Memory 350 includes storage for various software program modules used in conjunction with managing electronic documents for printing as part of a printing device, such as printing device 200 in FIG. 2 or MFDs 130a-130d in FIG. 1. Memory 350 includes a module for a print client 352, which can be a mobile client, desktop client, email client, etc. Print client 352 submits print jobs through a print server, such as print server module 356. Memory 350 also includes a print driver 354 that converts a source document, such as an electronic document produced using a word processing program on user device 300, print-ready electronic document. The source document may be, for example, a .pdf file, .doc file, .jpeg picture, .txt file, etc., that a user wishes to print, while the print-ready document is a rasterized document (e.g., bitmap document) or printer specific document that a printer (e.g., printing device 200) can print without further processing. Print server 356 accepts the print job from the print client 352. The electronic document, along with any related information or instructions for printing, is queued, in memory 340 or some other print queue storage location (e.g., internal or external to user device 300), as a print job until the user requests the print job be printed at a specific printer (e.g., printing device 200).

It is important to note that each printer may have different requirements for the format of the electronic document to be printed. As such, each of these requirements and formats must typically be loaded into memory 350, usually as part of print driver 354. Further, each printer may also maintain separate printing queues in print server 356. Including print server 356 in user device 300, including when user device 300 is incorporated in a printer such as printing device 200, allows a user to effortlessly begin printing the electronic document on a different printer without requiring the user to reload the remote electronic document or start a new print job.

Print client 352 may also include code, retrieved and executed by processor/controller 330, for identifying and providing instructions for printing a replacement version of an electronic document in place of the electronic document included as part of a print job requested by the user. Specifically, the code includes instructions for accessing one or more document retention locations associated with the electronic document included in the print job and comparing a set of electronic documents in the at least one document retention location with this electronic document. The one or more document retention locations may be any memory location to which the user has granted or enabled access including, but not limited to file repositories, remote servers, websites, or one or more folders or memory locations in memory 350. The comparison may include comparing any characteristics identified within the electronic document as well as any information or metadata that may be included in or with the electronic document. The comparison and any additional determination aspects may include any suitable comparison or determination mechanism such as any of the mechanisms described herein. For example, the code may include instructions for determining if the save date of at least one electronic document from the set of electronic documents in the one or more document retention locations is a later date than the save date of the electronic document included in the print job.

The code additionally includes instructions for providing a notification message to the user on GUI 370. The notification identifies one or more electronic documents or versions of the electronic document included in the print job from the set of electronic documents for review as a replacement. The code may also include instructions for replacing the electronic document included in the print job with the electronic document or version of electronic document that has been selected as the replacement by the user. with one of the at least one of the electronic documents based on a user response to the notification from the user after the notification is provided to the user. Additionally, the code may include instructions to modify the printing instructions in the print job to replace the electronic document included in the print job with the selected replacement electronic document or replacement version of the electronic document.

User interface 212 may display additional messages associated with identifying and printing the replacement document as well as accept inputs from the user. In some embodiments, user interface 212 may include an entry screen that allows a user to enable or disable the replacement version identification feature. The entry screen may be displayed as a general selection for the user or as part of creating or editing instructions associated with a print job. Further, user interface 212 may include an entry screen that allows a user to input one or more search document retention locations. The entry screen may also include selectable buttons for individually enabling or disabling access to one or more of the entered document retention locations.

GUI 370 may include an entry screen that allows a user to enable or disable the replacement version identification feature. GUI 370 may also include an entry screen that allows a user to input one or more search document retention locations along with selectable buttons for individually enabling or disabling access to one or more of the entered document retention locations.

Figure 4:
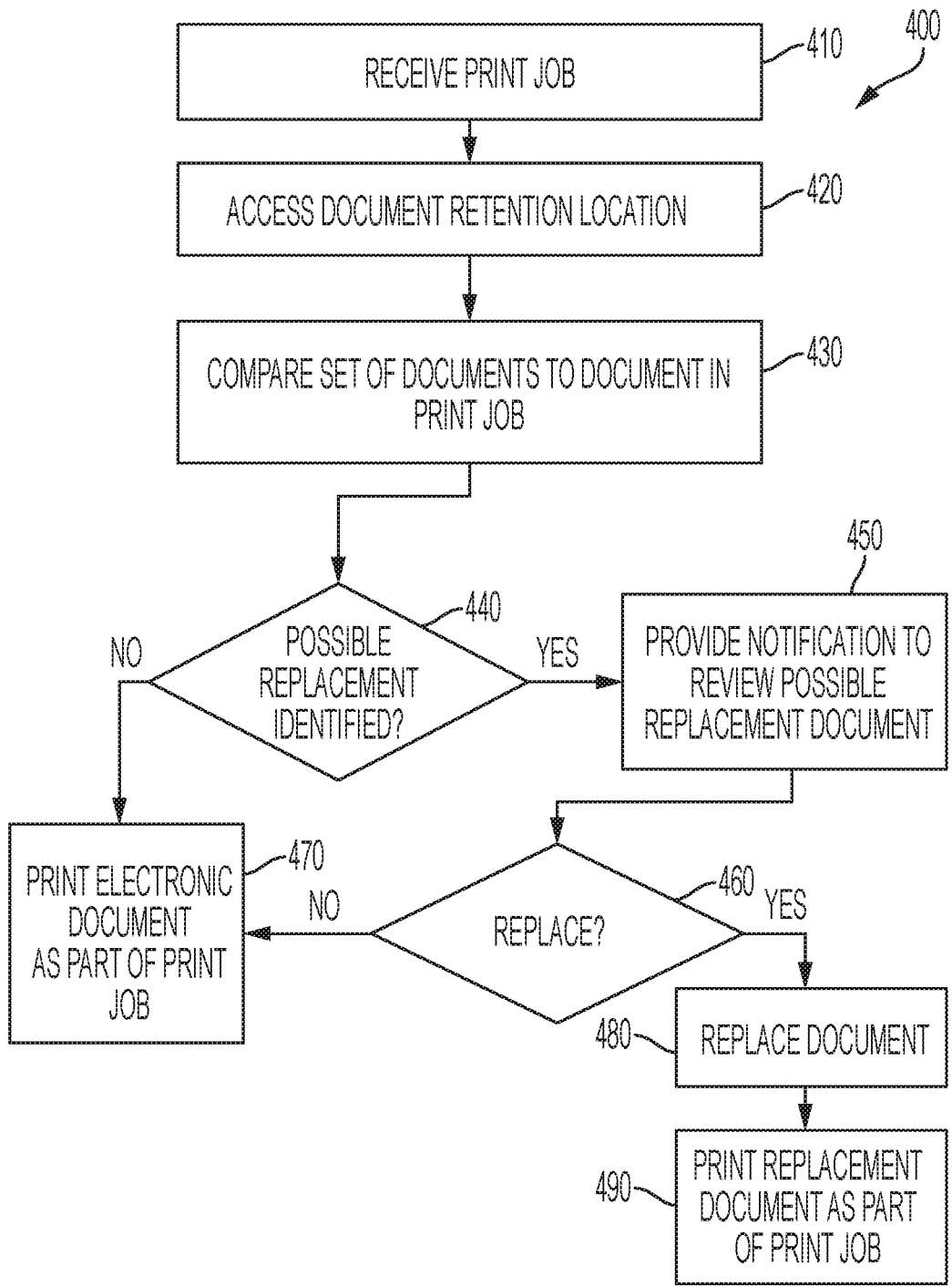
FIG. 4 depicts an exemplary process for identifying and printing a replacement version of an electronic document.

FIG. 4 depicts an exemplary process 400 for identifying and printing a replacement version of an electronic document. Process 400 is primarily described with respect to a printing device, such as printing device 200 described in FIG. 2. The printing device may also include a user control device, such as user device 300 described in FIG. 3. Process 400 may also be performed by a printer in combination with other functions, such MFDs 130a-130d described in FIG. 1. In other embodiments, some or all the elements of process 400 may be implemented in a user device connected to a printer or MFD, such as user device 300. Although process 400 depicts steps performed in a particular order for purposes of illustration and discussion, the operations discussed herein are not limited to any particular order or arrangement. One skilled in the art, using the disclosures provided herein, will also appreciate that one or more of the steps of process 400 may be omitted, rearranged, combined, and/or adapted in various ways.

At step 410, a print job is received. The print job may be received at printing device 200 from a user device (e.g., user device 300) through a network (e.g., network 110). A user may create or generate the print job at the user device. Alternatively, the user may create the print job at printing device 200 as part of receiving the print job, at step 410. The print job includes an electronic document for printing on printing device 200. The print job may also include instructions for printing the electronic document as requested by the user. The instructions may be provided directly on printing device 200 through user interface 212 or may be provided through network interface 214 from a user device e.g., user device 300) as part of the print job. Based on the instructions, print processor may instruct print engine 240 to print the electronic document provided in the print job. The instructions may also enable printing device 200 to perform a search and comparison to identify possible replacement electronic documents for the electronic document provided in the received print job.

At step 420, based on instructions from the user, either included in the print job or entered directly through user interface 212, one or more document retention locations associated or identified with the electronic document in the received print job are accessed. The accessible document retention locations may include, but are not limited to, a memory location on a user device (e.g., user device 300), a memory location in printing device 200, a memory location on a shared network storage device, and a storage location associated with an internet network website identified through a URL.

At step 430, a comparison is performed on a set of electronic documents located at the document retention locations to the electronic document provided in the received print job. At step 440, in conjunction with the comparison at step 430, one or more determinations are performed to identify possible replacement electronic documents for the electronic document provided in the received print job. The determination and identification, at step 440, may include matching one or more characteristics or metadata elements associated with electronic documents. The characteristics may include but are not limited to, user identifications, document owner identifications, filenames of the electronic documents, file size of the electronic documents, line or page length of the electronic documents, save dates of the electronic documents, creation dates of the electronic documents, and the like. In one example, a possible replacement electronic document may be identified by determining that the filename for the electronic document located in a memory location on a user device for the user matches the filename of the electronic document provided in the received print job and the save date of the possible electronic document indicated that the electronic document from the memory location on the user device is a newer or more recent version than the electronic document provided in the received print job. It is important to note that other possible determination mechanisms may be used at step 430 as part of determining and identifying possible replacement electronic documents. For example, a document search algorithm may be used to perform automated version checks upon when an electronic document is added to a print job but prior to submitting that electronic document with the print job for printing.

If it is determined, at step 440, that one or more possible replacement electronic documents for the electronic document provided in the print job are identified, then, at step 450, a notification is provided to the user that requested or is printing the electronic document as part of the print job. The notification includes identification of the possible replacement electronic documents for review. The notification may be provided from printing device 200 to the user over a network (e.g., network 120) as a notification message via an electronic communication mechanism, including those described above. The notification message may be delivered to one or more devices of the user, including the user device (e.g., user device 300) used to create the print job. The notification message may also be displayed on a display as part of user interface 212 on printing device 200. Information regarding the notification message will be provided in further detail below.

At step 460, the information provided in the notification message and, if necessary, the possible replacement electronic documents identified in the notification message is/are reviewed. If, at step 460, one of the identified replacement electronic documents is selected to replace the electronic document provided in the received print job, then, at step 480, the electronic document provided in the received print job is replaced with the selected replacement electronic document. The replacement mechanism, at step 480, may include removing the electronic document in the received print job from memory and replacing it with the selected replacement electronic document at the same location in storage 210. Alternatively, the replacement mechanism, at step 480, may include changing an indicator or entry, such as a pointer to a memory location or file metadata, in the instructions included with the print job. At step 490, the selected replacement electronic document is printed in printing device 200 as part of the completion of the received print job using instructions provided by print processor 224 to print engine 240 as described above.

If it is determined, at step 440, that a possible replacement electronic document is not identified or at step 460, the user does not select a replacement electronic document, then, at step 470, the original electronic document provided in the received print job is printed as part of the completion of the received print job in printing device 200 as described above.

Figure 5:
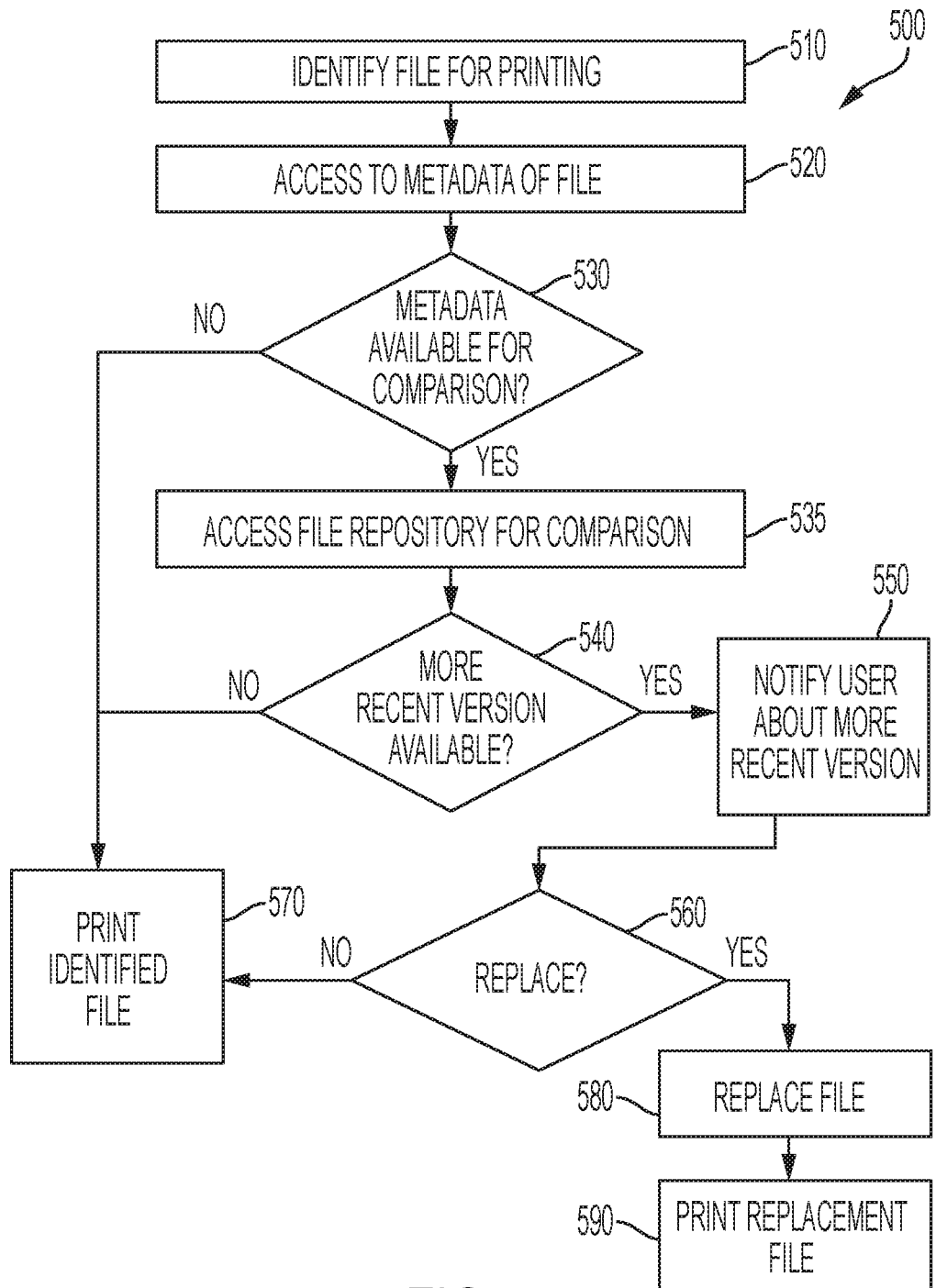
FIG. 5 depicts another exemplary process for identifying and printing a replacement version of an electronic document

FIG. 5 depicts another exemplary process 500 for identifying and printing a replacement version of an electronic document. Process 500 is primarily described with respect to a printing device, such as printing device 200 described in FIG. 2. The printing device may also include a user control device, such as user device 300 described in FIG. 3. Process 500 may also be performed by a printer in combination with other functions, such MFDs 130*a*-130*d* described in FIG. 1. In other embodiments, some or all of the elements of process 500 may be implemented in a user device connected to a printer or MFD, such as user device 300. Although process 500 depicts steps performed in a particular order for purposes of illustration and discussion, the operations discussed herein are not limited to any particular order or arrangement. One skilled in the art, using the disclosures provided herein, will also appreciate that one or more of the steps of process 500 may be omitted, rearranged, combined, and/or adapted in various ways. Further, some aspects of steps 540, 550, 560, 570, 580, and 590 in process 500 are similar to the aspects of steps 440, 450, 460, 470, 480, and 490 described above in process 400 and as such will not be further described in detail here At step 510 an electronic file is identified for inclusion in print request or a print job. The print request or print job may be created or generated, at step 510, at a user device (e.g., user device 300) and may be transmitted to printing device 200 over a network (e.g., network 120). Alternatively, a user may create the print request or print job at printing device 200 as part of identifying the electronic file. The print request or print job may also include additional instructions for printing the identified electronic file as requested by the user.

At step 520, based on instructions from the user either included in the print job or entered directly at printing device 200 on user interface 212, metadata for the identified electronic file is accessed. As described above, metadata may be incorporated within the identified electronic file itself or may be included as separate information stored and/or provided along with the identified electronic file. The metadata may include information about the identified electronic file and may also include any operations performed on the identified electronic file. Examples of operations may include, but are not limited to, opening the file, editing the file, saving the file, and the like. For example, the metadata within the identified electronic file may specify a storage location for a master version of the identified electronic file. In some instances, the metadata may facilitate a lightweight implementation for automatic file versioning.

A step 530, a determination is made as to whether metadata exists for the identified electronic file. If, at step 530, it is determined that metadata exists, then at step 535, one or more file repositories, such as the storage location for the master version of the identified electronic file, are accessed. As part of accessing the one or more file repositories, at step 535, a comparison is performed on electronic files in the file repositories having some or all elements characteristics of metadata matching to the identified electronic file.

At step 540, a determination is made as to whether one or more of the electronic files in the file repositories represent a newer or more recent version of the identified electronic file based on the comparison of the metadata. If it is determined, at step 540, that one or more newer, or more recent, versions of the identified electronic file are available as a possible replacement, then, at step 550, a notification identifying the possible replacement electronic files is provided to the user that requested or is printing the identified electronic file as part of the print request or print job.

At step 560, the information provided in the notification is reviewed. If, at step 560, one of the newer or more recent version electronic files is selected to replace the identified electronic file, then, at step 580, the identified electronic file is replaced with the selected newer version electronic file. At step 590, the selected newer version electronic file is printed as a replacement for the identified electronic file to fulfill or complete the print request or print job in printing device 200.

If it is determined that no metadata is available for comparison at step 530 or that a newer version of the electronic file is not identified at step 540, or further if the user does not choose to print the newer version of the electronic document at step 560, then, at step 470, the identified electronic file is printed to fulfill or complete print request or print job in printing device 200.

It is important to note that one or more aspects or steps in process 400 or process 500 may be enabled or disabled based on user inputs. For example, the user may enable or disable the entire process 400 or process 500 for identifying and printing a replacement version of the electronic document or file. The user may also enable or disable access to one or more of the entered document retention locations or file repositories. The user may further enable or disable use of certain characteristics and/or metadata, such as file size or owner identification, for use in the comparison and/or determination steps of process 400 or process 500.

Figure 6:
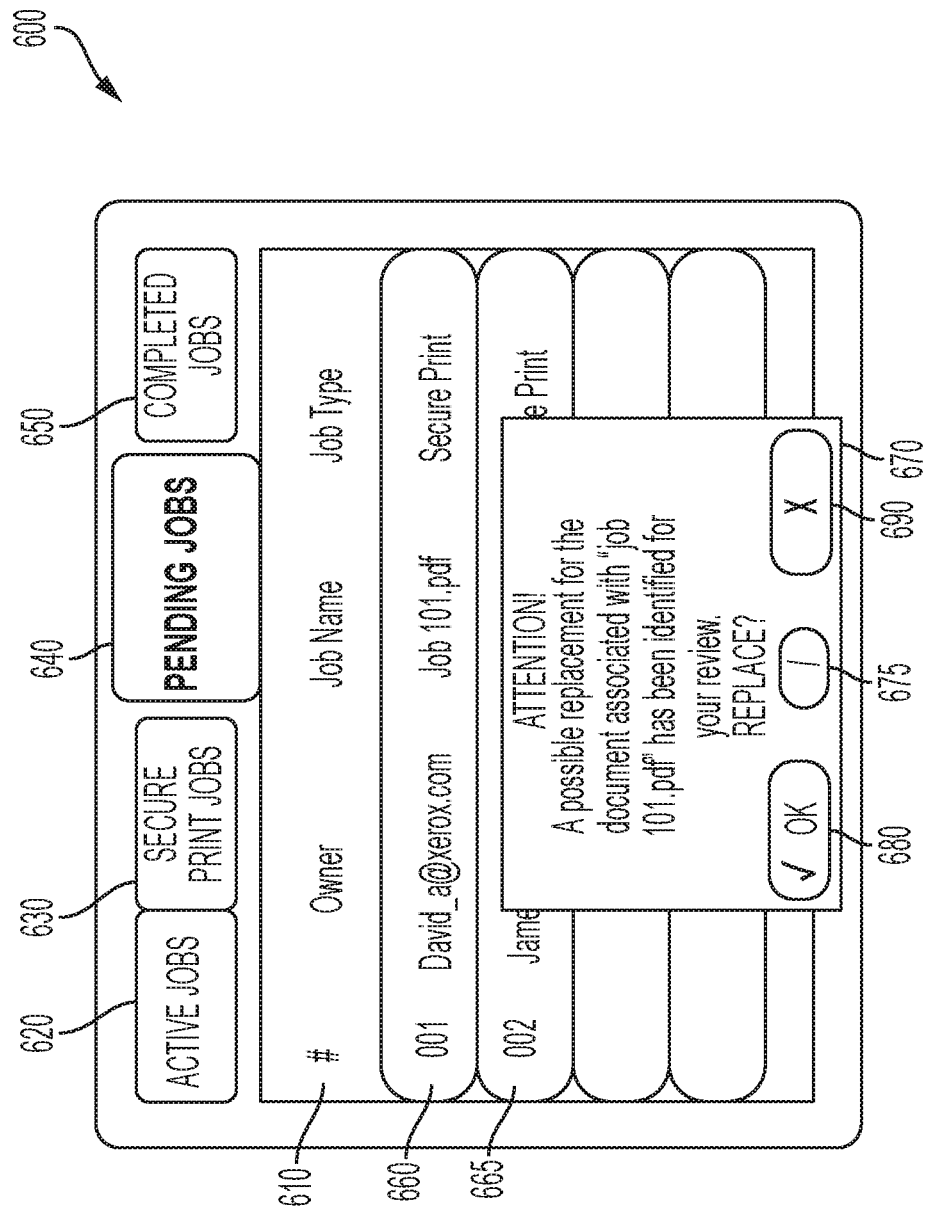
FIG. 6 depicts an exemplary screenshot from a display on a device used for identifying and printing a replacement version of an electronic document.
Figure 7:
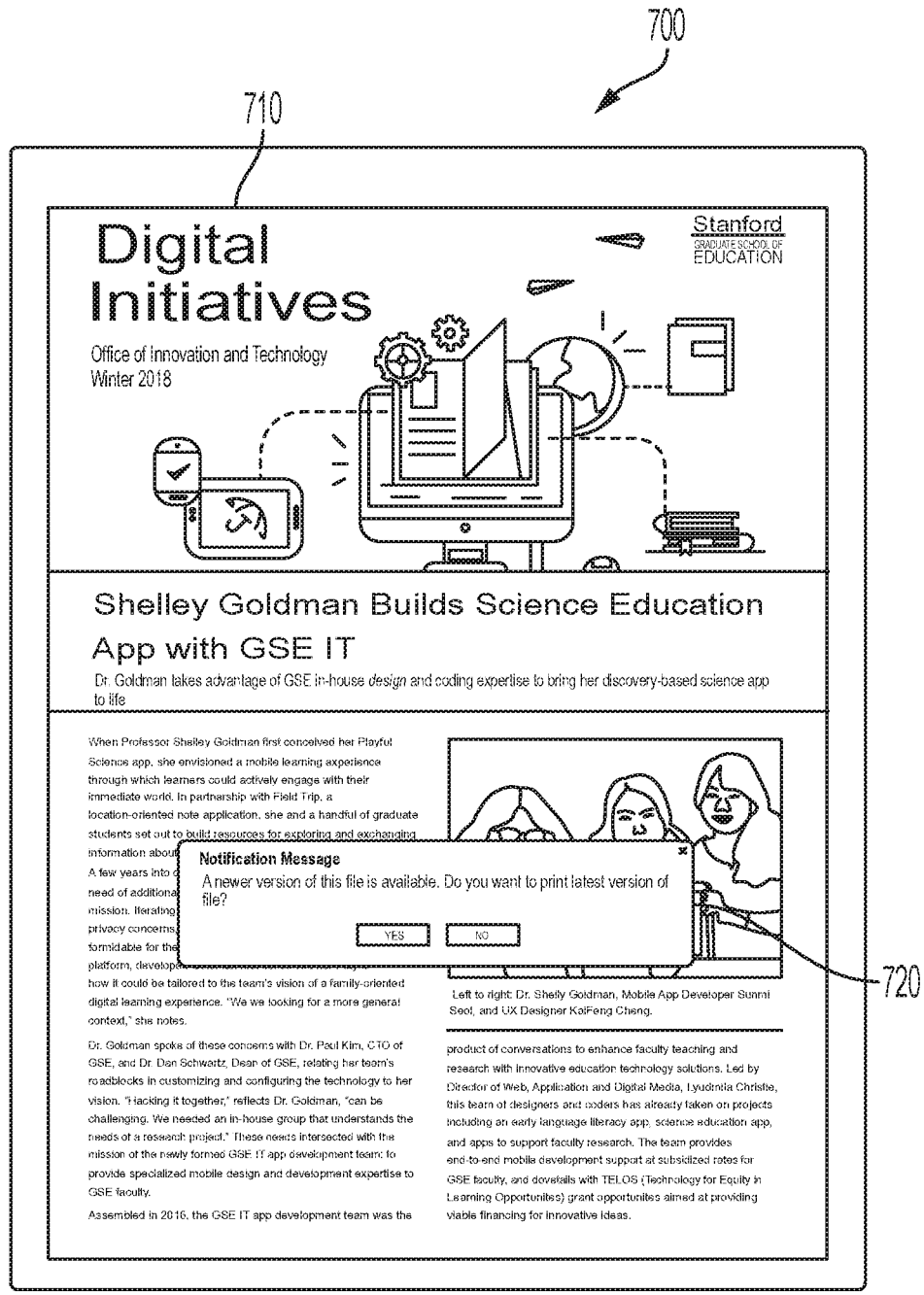
FIG. 7 depicts another exemplary screenshot from a display on a device used for identifying and printing a replacement version of an electronic document.

The following description for FIGS. 6-7 involve exemplary screenshots from a display in a user interface used as part of identifying and printing a replacement version of an electronic document as described herein. The display may be included in one or more user interfaces, such as user interface 212 described in FIG. 2 or GUI 370 described in FIG. 3. Further, the exemplary screenshots in FIGS. 6-7 will be described in relation to one or more of the steps of process 400 described in FIG. 4. The exemplary screenshots in FIGS. 6-7 may equally apply to one or more steps of process 500 described in FIG. 5. It is important to note that the exemplary screenshots in FIGS. 6-7 may be used in other processes similar to, and/or containing aspects of process 400 or process 500 in conjunction with identifying and printing a replacement version of an electronic document.

FIG. 6 depicts a document print selection screen 600. Document print selection screen 600 includes four print group selection tabs, an active jobs tab 620, a secure print jobs tab 630, a pending jobs tab 640, and a completed jobs tab 650. As shown in document print selection screen 600, the pending jobs tab 640 is selected as part of the printing process and further initiating a comparison and determination mechanism for identifying possible replacement electronic documents and selecting one of the replacement documents as described above in steps 430, 440, 450, and 460 described in FIG. 4 or steps 535, 540, 550, and 560 described in FIG. 5.

A pending jobs window 610 associated with the pending jobs tab 640 includes a set of rows 660, 665 for entries identifying currently pending print jobs. Each of the rows 660, 665 includes information for each pending print job, including a print job number, an owner, a job name that may be assigned by the printer, and a job type (e.g., secure print).

A notification window 670 is shown overlaid on pending jobs window 610. Notification window 670 includes a text message notifying the user, such as the user who created the electronic document associated with a print job or another user who is printing, with permission if necessary, the electronic document associated with the print job, identified as "job 101.pdf", that a possible replacement electronic document has been identified for review.

An I button 675 is included to allow the user to recover and view information related to the possible replacement electronic document. In some embodiments, selecting the I button 675 displays the possible replacement electronic document for review. In some embodiments, selecting the I button 675 displays only the filename and document location information for the possible replacement electronic document to facilitate retrieval and review of the electronic document on a different display (e.g., display as part of GUI 370). In some instances, the information provided when selecting the I button 675 may be sent to a different device to allow easier or more convenient retrieval and review.

An Ok button 680 is included to allow the user to select the possible replacement electronic document identified in notification window 610. A cancel (X) button 890 is also included to allow for exit from the notification window 670 when the user does not select the possible replacement electronic document identified in notification window 670. Selecting either the Ok button 680 or the cancel (X) button 690 will close notification window 670 in order to allow the printing process to continue (e.g., step 470 or 480 in process 400). In some embodiments, notification window 670 may include a timeout feature preventing inattention to the selection of a possible replacement electronic document from preventing or delaying the printing of other print jobs.

In some embodiments, notification window 670 may display a list of possible replacement electronic documents, each with a set of buttons similar to buttons 675, 680, and 690. Each possible replacement electronic document removed from consideration using the cancel (X) button (e.g., button 690) or one of the possible electronic documents may be selected using the corresponding OK button (e.g., button 680) closes the notification window (e.g., window 670) in order to allow the printing process to continue as described above.

FIG. 7 depicts a document display screen 700. Document display screen 700 may be displayed as part of the printing process and further initiating a comparison and determination mechanism for identifying possible replacement electronic documents as described above in steps 430, 440, 450, and 460 described in FIG. 4 or steps 535, 540, 550, and 560 described in FIG. 5.

Document display window 700 includes an electronic file 710 displaying the information (e.g., text and graphics elements) included in the electronic file, such as included in a received print job. Electronic file 710 may be displayed in its entirety in document display window 700 or may include some form of navigation to change the display range for information in the electronic document, such as a pagination selection element or a window slider selection element (not shown).

A notification window 720 is shown overlaid on electronic file 710. Notification window 720 includes a text message notifying the user that a possible replacement electronic file, a newer version of the file, has been identified for possible printing as a replacement for the electronic file displayed and/or selected for printing. Notification window 720 also includes two selection buttons. A first button, identified as "yes", selects the option to print identified newer version as a replacement for the electronic file 710 and continue with process 400 or 500 as described above. A second button, identified as "no", selects the option to instead print the displayed electronic file 710 and continue with process 400 or 500 as described above. In some embodiments, an additional button may be included for viewing and/or accessing information about the identified newer version electronic file or for opening an additional file window to display the identified newer version electronic file. It is important to note that multiple possible replacement files may be displayed in notification window 720 in a manner similar to that described above.

The terms printer, MFD, or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color or monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

While some of the embodiments have been described in the general context of program modules or nodes that execute in conjunction with an application program that runs on an operating system on a computing device, those skilled in the art will recognize that aspects may also be implemented in combination with other program modules or nodes.

Generally, program modules or nodes include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communication network. In a distributed computing environment, program modules may be located in both local and remote memory storage devices.

Some of the embodiments described above may further be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process (es). The computer-readable storage medium is a computer-readable memory device. The computer-readable storage medium can, for example, be implemented via one or more of a volatile computer memory, a non-volatile memory, a hard drive, a flash drive, a floppy disk, or a compact disk, and comparable media.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

Although embodiments which incorporate the teachings of the present disclosure have been shown and described in detail herein, those skilled in the art can readily devise many other varied embodiments that still incorporate these teachings. Having described preferred embodiments of systems and methods for identifying and printing a replacement version of an electronic document (which are intended to be illustrative and not limiting), it is noted that modifications and variations can be made by persons skilled in the art in light of the above teachings. It is, therefore, to be understood that changes may be made in the particular embodiments of the disclosure disclosed which are within the scope of the disclosure as outlined by the appended claims.

What is claimed is:

1. A method, comprising:
    receiving a first version of an electronic document as part of a print request from a user;
    accessing at least one document retention location associated with the received electronic document;
    comparing a set of electronic documents in the at least one document retention location with the first version of the electronic document based on a document characteristic, wherein the document characteristic comprises one or more of a user identification, an owner identification, a filename, a file size, a page length, a save date, and a creation date;
    identifying a second version of the electronic document from the set of electronic documents based on the comparison;
    providing a notification to the user, the notification comprising the identification of the second version of the electronic document from the set of electronic documents for review as a replacement for the first version of the electronic document; and
    receiving a selection by the user of the first or second version of the electronic document for advancing the print request.

2. The method of claim 1, further comprising replacing the first version of the electronic document with the second version of the electronic document based on the selection.

3. The method of claim 1, further comprising printing the first or second version of the electronic document as part of fulfilling the print request from the user.

4. The method of claim 1, wherein the identification further comprises determining if the save date of the second version of the electronic document in the at least one document retention location is a later date than the save date of the first version of the electronic document.

5. The method of claim 1, wherein the notification is provided using one or more of communicating the notification via an email message, communicating the notification via a short messaging service message, communicating the notification via a multimedia messaging service message, displaying the notification on a webpage, displaying the notification on a display of a computing device, and displaying the notification on a display of a printing system used for printing the received electronic document.

6. The method of claim 1, wherein the at least one document retention location comprises one or more of a memory location on a user device, a memory location in a printing device, a memory location on a shared network storage device, and a uniform resource locator in a network.

7. An apparatus comprising:
    a memory for storing a first version of an electronic file associated with a print request from a user; and
    a processor configured to:
        provide instructions for accessing at least one file repository associated with the first version of the electronic file;
        compare a set of electronic files in the at least one file repository with the first version of the electronic file based on a file characteristic, wherein the file characteristic comprises one or more of a user identification, an owner identification, a filename, a file size, a page length, a save date, and a creation date;
        identify a second version of the electronic file from the set of electronic files based on the comparison;
        provide a notification to the user, the notification comprising the identification of the second version of the electronic file from the set of electronic files for review as a replacement for the first version of the electronic file; and
        receive a selection by the user of the first or second version of the electronic file for advancing the print request.

8. The apparatus of claim 7, further comprising replacing the first version of the electronic file with the second version of the electronic file based on the selection.

9. The apparatus of claim 7, wherein the processor is further configured to determine if the save date of the second version of the electronic file is a later date than the save date of the first version of the electronic file.

10. The apparatus of claim 7, wherein the at least one file repository comprises one or more of a memory location on a user device, a memory location in a printing device, a memory location on a shared network storage device, and a uniform resource locator in a network.

11. A printing apparatus comprising:
    a printing engine that prints information associated with an electronic document on a physical readable medium based on instructions in a print job for a first version of the electronic document requested by a user;
    a print processor that provides instructions to receive the print job and the first version of the electronic document for the print job requested by the user, the print processor further accessing at least one document retention location associated with the electronic document of the print job, compares a set of electronic documents in the at least one document retention location with the first version of the electronic document of the print job based on a document characteristic, and identifies a second version of the electronic document from the set of electronic documents based on the comparison, wherein the document characteristic comprises one or more of a user identification, an owner identification, a filename, a file size, a page length, a save date, and a creation date; and
    a user interface that displays a notification message identifying a second version of the electronic document from the set of electronic documents for review by the user as a replacement for first version of the electronic document of the print job, and receives a selection by the user of the first or second version of the electronic document for advancing the print request.

12. The printing apparatus of claim 11, wherein said print processor replaces the first version of the electronic document of the print job with the second version of the electronic document based on the selection.

13. The printing apparatus of claim 11, further wherein the print processor provides instructions to the print engine to print the first or second version of the electronic document as part of completing the print job requested by the user.

14. The printing apparatus of claim 11, wherein the identification by the print processor further comprises determining if a save date of the second version of the electronic document in the at least one document retention location is a later date than a save date of the first version of the electronic document of the print job.

15. The printing apparatus of claim 11, wherein the at least one document retention location comprises one or more of a memory location on a user device, a memory location in a printing device, a memory location on a shared network storage device, and a uniform resource locator in a network.

\* \* \* \* \*